(12) United States Patent
Huhn

(10) Patent No.: US 6,660,190 B2
(45) Date of Patent: Dec. 9, 2003

(54) FIRE AND FLAME RETARDANT MATERIAL

(76) Inventor: James R. Huhn, 4211 W. First St., #131, Santa Ana, CA (US) 92703

(*) Notice: Subject to any disclaimer, the term of this patent is extended or adjusted under 35 U.S.C. 154(b) by 161 days.

(21) Appl. No.: 10/016,433

(22) Filed: Nov. 1, 2001

(65) Prior Publication Data

US 2003/0087995 A1 May 8, 2003

(51) Int. Cl.[7] .................. C09K 21/02; C09K 21/14; E04B 1/94; C08L 63/00; D06M 11/44; D06M 15/04

(52) U.S. Cl. .................. 252/602; 252/606; 252/608; 252/609; 252/62; 252/378 R; 524/9; 524/16; 523/179; 523/446; 57/904; 8/115.6; 8/115.51; 428/921

(58) Field of Search .................. 252/601, 602, 252/606, 607, 608, 609, 378 R, 62; 524/9, 16; 523/179, 446; 57/904; 8/115.51, 115.6; 428/921

(56) References Cited

U.S. PATENT DOCUMENTS

| | | | |
|---|---|---|---|
| 3,806,959 A * | 4/1974 | Gross | 5/482 |
| 4,045,386 A * | 8/1977 | Hartman | 527/105 |
| 4,095,985 A * | 6/1978 | Brown | 106/18.11 |
| 4,113,919 A * | 9/1978 | Hartman | 428/529 |
| 4,144,205 A * | 3/1979 | Hartman et al. | 524/16 |
| 4,168,175 A * | 9/1979 | Shutt | 106/15.05 |
| 4,218,502 A * | 8/1980 | Graham et al. | 428/144 |
| 4,224,086 A * | 9/1980 | Stokes et al. | 148/26 |
| 4,515,633 A * | 5/1985 | Cruz, Jr. | 106/18.26 |
| 4,670,067 A * | 6/1987 | Suzuki et al. | 148/26 |
| 4,923,530 A * | 5/1990 | Miki et al. | 148/26 |
| 5,032,446 A * | 7/1991 | Sayles | 428/161 |
| 5,112,533 A * | 5/1992 | Pope et al. | 252/607 |
| 5,156,326 A * | 10/1992 | Gibson | 228/223 |
| 5,171,377 A * | 12/1992 | Shimizu et al. | 148/23 |
| 5,331,956 A * | 7/1994 | Bailey | 128/202.13 |
| 5,407,481 A * | 4/1995 | Drew | 106/672 |
| 5,480,587 A * | 1/1996 | Musselman et al. | 252/609 |
| 5,582,759 A * | 12/1996 | Bursey, Jr. | 252/2 |
| 5,758,770 A * | 6/1998 | Moneta | 206/379 |
| 5,829,200 A * | 11/1998 | Jones et al. | 52/3 |
| 5,948,323 A * | 9/1999 | McLaughlin et al. | 252/610 |

* cited by examiner

Primary Examiner—Joseph D. Anthony
(74) Attorney, Agent, or Firm—Roy A. Ekstrand

(57) ABSTRACT

A fire and flame retardant composition is provided by mixing brazing flux, baking soda, lime and redwood bark to form the basis of the material composition. The basic material is then readily combined with other materials including flammable items such as silicone, epoxy glue, or the like to produce a composite material which remains resistant or impervious to fire and flame. The basic material composition is further combined with a suitable binder such as silicone to form a coating mixture which, when layered upon a fabric such as cotton fabric, produces a fire and flame retardant garment which also produces improved insulation and protective characteristics while remaining flexible.

12 Claims, 2 Drawing Sheets

FIRE AND FLAME RETARDANT MATERIAL

FIELD OF THE INVENTION

This invention relates generally to material used to improve fire and flame retardant qualities of other materials and particularly to materials utilized in combination with other materials to improve their fire and flame resisting qualities.

BACKGROUND OF THE INVENTION

Many of the materials commonly used throughout a modern society which are so prevalent and pervasive as to go unnoticed are unfortunately highly flammable. As a result, various items and environments created for persons within such society are sources of substantial risk to the user's and occupants arising out of fire and burning. For example, building materials used in most structures such as dwellings, commercial facilities and storage facilities include fabrication components such as wood, wood products, plastics, other synthetic materials and so-called composite materials. Often these man-made materials such as plastics, synthetics and composite materials employ binder materials which are highly volatile when heated and which are highly flammable and, in some instances, actually explosive in character.

In addition to the use of flammable and easily burned constituency in the building arts, other industries providing products such as clothing, household articles and furniture, automobiles and other vehicles also rely heavily upon materials for fabrication which are flammable. Home appliances and other articles used in the home such as novelty items and decorative items are also likely to contain flammable material.

As a result of the pervasive and continuing use of flammable or combustible materials throughout society, practitioner's in the art have recognized and imperative need for protective materials which attempt to either render such materials to be flame or fire resistant or to provide a substantial improvement in heat insulation and resistive character.

In addition to the need to provide protective materials for otherwise flammable constituents of everyday society, a further need for protective material which improves fire or flame retardant properties arises in the fabrication of fire protective clothing or garments which are utilized by persons who, of necessity or choice, interact directly with fire or flame environments. Such clothing and fire resistant garments are used for example by fire fighters, hazardous material fire specialists and workers employed in industrial situations which require operation in extremely high temperature environments or environments which subject the worker to fire or flame such as steel mills or the like. Attempts to produce clothing or garments which are fire protective or heat resistant for such users must in addition to fire and flame retardant or resistant qualities also possess a high level of heat insulation property.

Faced with the continuing use of flammable materials throughout society and the need for fire protective clothing or garments, practitioner's in the art have endeavored to create a variety of fire and flame retardant or resistant materials. For example, U.S. Pat. No. 4,095,985 issued to Brown sets forth a THERMAL BARRIER COMPOSITIONS in which a composition is particularly adapted for coating structural surfaces to provide them with a thermal carrier to protect them from the detrimental effects of fire comprises an aqueous mixture of (a) lithium mica, (b) wollastonite, (c) aluminum trihydrate, (d) nepheline syenite, and (e) soda bicarbonate. The composition may be diluted with water to facilitate application. The composition may also contain raw vermiculite, sodium aluminum sulfate, borax, calcium sulfate, sodium silicate and other additives to improve the fireproofing, insulation and/or structural strength properties of the material.

U.S. Pat. No. 5,112,533 issued to Pope et al. sets forth a FIRE SUPPRESSING COMPOSITIONS AND METHOD which are produced by reaction of lignosulfonates with carbonate of soda to produce low-cost chemical reagents useful for fighting fires in progress or for treating flammable materials to render them non-flammable. Methods for producing the fire retardant compositions in liquid, foam or adhesive form are also disclosed.

U.S. Pat. No. 4,168,175 issued to Shutt sets forth a FIRE RETARDANT COMPOSITIONS which are generally non-caking compositions of intimately intermixed ammonium phosphate, e.g. mono and/or diammonium phosphate; sodium tetraborate containing molecularly bound water, e.g. the decahydrate, borax; and fractured finely ground solid powder particles of soda-containing silicate glass which have a high and irregular surface area and an active dry moisture absorbent surface condition for maintaining the particles of ammonium phosphate and sodium tetraborate in moisture protected disposition and for inhibiting the tendency of such particles to adhere to one another.

U.S. Pat. No. 4,515,633 issued to Cruz, Jr. sets forth POLYMERIC MATERIALS COMBINED WITH MODIFIED HYDRATED MAGNESIUM ALUMINOSILICATES in which the aluminosilicates are treated with aqueous acidic solutions and subjected to controlled agitation to convert highly porous concertina-shaped granular hydrated magnesium aluminosilicates into groups of electrolyte insensitive platelets. Water slurries of the groups of platelets when dried to form coherent, continuous sheets which when mechanically disintegrated may be reslurried in water. The modified heat exfoliated magnesium aluminosilicates are adapted for use in fire retardant, loose fill cellulose insulation, paper and pulp products, synthetic polymeric materials, coatings such as fire retardant acoustic coatings, dog foods, defoliants and the like.

U.S. Pat. No. 4,218,502 issued to Graham et al. sets forth INTUMESCABLE FIRE-RETARDANT PRODUCTS such as asphalt roofing material made fire-retardant by inclusion of a layer of intumescable hydrate soluble silicate particles. Preferred soluble silicate particles carry a protective moisture-resistant coating which increases the life of the roofing material, and also makes possible convenient manufacture of the particles. The protective coating includes a metal cation capable of reacting with the silicate ion of the core particle to form a reaction product that is less soluble than the core particle. The reaction is believed to seal any openings in the protective coating, thereby lengthening the effective life of the coating. Besides utility in roofing materials, the coated particles are useful as fire-retardant additives in many other products, including polymeric articles, sheet materials, coating compositions, etc.

U.S. Pat. No. 5,407,481 issued to Drew sets forth FLOWABLE PRESSURE-COMPENSATING MATERIALS which are directed toward improving one or more aspects of the flowable material, such as by providing/improving flame retardancy and/or the homogeneity of the composition over time. For instance, one composition includes a liquid, a viscosity-increasing material, and beads having a preselected coating thereon to provide for a coupling interaction with at least one of the liquid and the viscosity increasing material.

U.S. Pat. No. 5,480,587 issued to Musselman et al. sets forth MATERIALS FOR USE AS FIRE RETARDANT ADDITIVES using a method of modifying an inorganic material which evolves gases and/or vapors at a temperature which is detrimental to the processing the temperature of polymer or paper systems so that the modified material can be used as a fire retardant additive with that polymer or paper system. The method comprises the steps of: (1) providing a first material; (2) treating the first material to remove the portion which involves gas which is detrimental to the processing of the polymer or paper system; and (3) combining a second material with the first material to create a modified material which does not evolve gas at a temperature which is detrimental to the processing of the paper or polymer system.

U.S. Pat. No. 5,695,691 issued to McLaughlin et al. sets forth COLLOIDAL PARTICLES OF SOLID FLAME RETARDANT AND SMOKE SUPPRESSANT COMPOUNDS AND METHODS FOR MAKING THEM which concerns compounds that provide flame retardancy and/or smoke suppressant properties to fibers, textiles, polymeric articles, paper, paint, coating and insulation. More particularly, the present invention concerns colloidal-sized particles of hydrated salts, organic phosphates, metal borates, polyamides, solid halogenated flame retardants with a melting point greater than 250 degrees C., molybdenum compounds, metallocenes, antimony compounds, zinc compounds, bismuth compounds and other solid chemicals which act as flame retardants or smoke suppressants. The present invention also concerns various milling processes to reduce these materials to colloidal sizes and to disperse them in water, organic liquids and meltable solids.

U.S. Pat. No. 5,948,323 issued to McLaughlin et al. sets forth COLLOIDAL PARTICLES OF SOLID FLAME RETARDANT AND SMOKE SUPPRESSANT COMPOUNDS AND METHODS FOR MAKING THEM which concerns compounds that provide flame retardancy and/or smoke suppressant properties to fibers, textiles, polymeric articles, paper, paint, coating and insulation. More particularly, the present invention concerns colloidal-sized particles of hydrated salts, organic phosphates, metal borates, polyamides, solid halogenated flame retardants with a melting point greater than 250 degrees C., molybdenum compounds, metallocenes, antimony compounds, zinc compounds, bismuth compounds and other solid chemicals which act as flame retardants or smoke suppressants. The present invention also concerns various milling processes to reduce these materials to colloidal sizes and to disperse them in water, organic liquids and meltable solids.

While the foregoing described prior art compositions and materials have to some extent improved the art and have in some instances enjoyed commercial success, there remains nonetheless a continuing need in the art for ever more improved, efficient, effective and economically producible fire and flame retardant materials.

SUMMARY OF THE INVENTION

Accordingly, it is a general object of the present invention to provide an improved fire and flame retardant material. It is a still more particular object of the present invention to provide a flame and fire retardant composition which may be utilized in combination with other normally flammable materials to produce a final material which is highly flame and fire resistant. It is a still more particular object of the present invention to provide an improved fire and flame retardant material which may be mixed with appropriate binders to form flexible insulative coating materials which retain fire and flame retardant qualities. It is a still more particular object of the present invention to provide an improved fire and flame retardant material which may be fabricated in a straight forward simple method of fabrication and which may be produced utilizing readily available materials which are neither exotic in character nor expensive to purchase.

In accordance with the present invention there is provided a fire and flame retardant composition comprising brazing flux, baking soda, lime and redwood bark mixed in approximately equal parts by volume. In a general sense, the invention provides a fire and flame retardant composition comprising by percentage volume: brazing flux 10% to 40%, baking soda 10% to 40%, lime 10% to 40% and redwood bark 10% to 40%.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
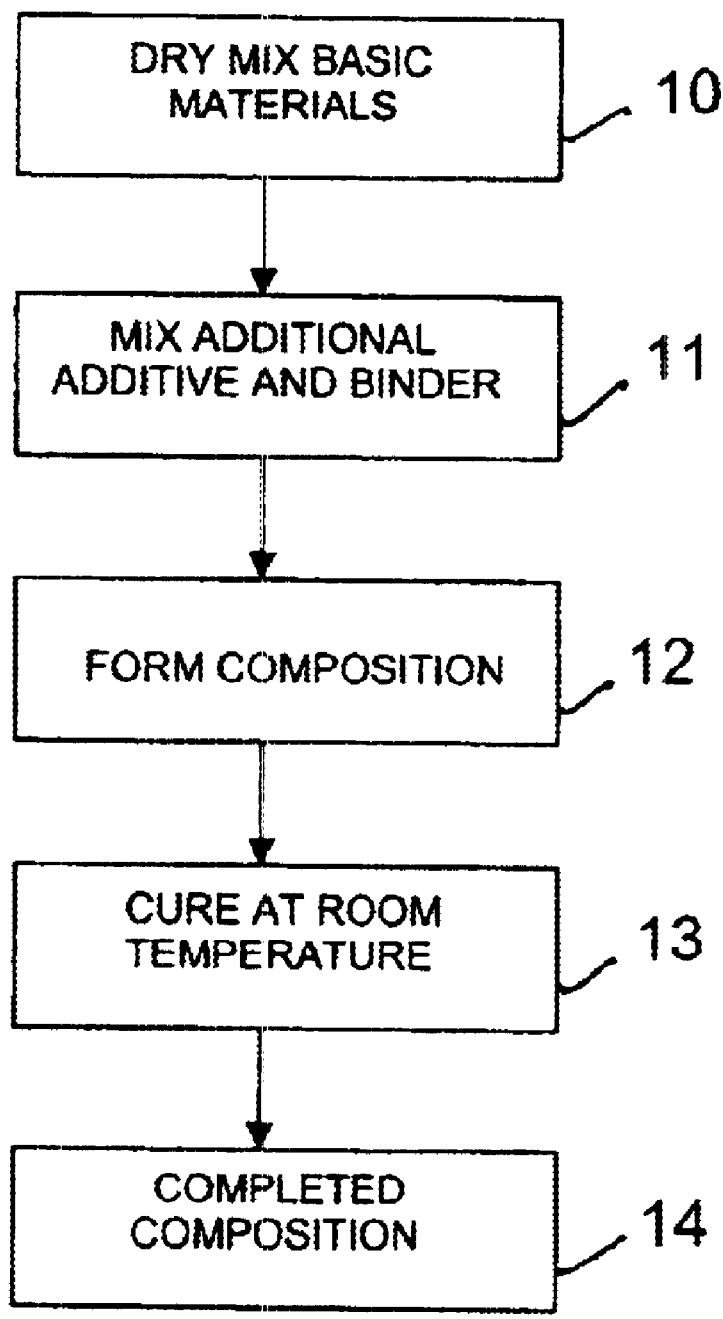
FIG. 1 sets forth a flow diagram depicting the production of the present invention fire and flame retardant material used in combination with other materials to produce an improved fire and flame retardant composition.

The present invention provides a great variety of fire and flame retardant and protective materials for an equally broad range of uses. The use of the present invention material may be generally divided between the provision of a flame and fire retardant material which is capable of being combined or mixed with other materials which are normally flammable to provide a flame and fire resistant compound or alternatively the present invention flame and fire retardant material may be utilized as a flexible coating for materials such as fabrics or the like to produce heat insulative as well as flame and fire retardant garments or clothing. In both of the primary uses of the present invention material, the initial dry mixture of ingredients to provide the basic inventive flame and fire retardant material is carried forward in substantially the same general manner. Accordingly, a combination of brazing flux, baking soda, lime and redwood bark is combined in generally equally proportions by weight to produce the basic flame and fire retardant material. Although, the proportion of redwood bark may be varied between one and five proportionate parts to adjust mixture weight. This basic material is then either (a) combined with other materials such as binders or suitable liquids to provide a composition of flame and fire retardant character in the manner shown and described in FIG. 1. Alternatively, the basic mixture described above may be (b) combined with a suitable solvent or binder to provide a coating mixture which may be layered upon a fabric or other garment in the manner generally described and set forth in FIG. 2 for a protective cloth fabric process.

As described below in greater detail, the basic combination of ingredients set forth above provides dramatically improved flame and fire retardant character and protection of virtually all materials with which it is combined to form components. Dramatically this flame and fire retardant character is created notwithstanding its combination with materials which are otherwise flammable in character. In the use of the present invention flame and fire retardant material described in connection with FIG. 2 to produce flame and fire retardant fabric, a normally flammable cotton cloth when coated with the present invention material and suitable cured and dried becomes substantially flame and fire retardant. In addition, substantial thermal insulative properties are provided which have been shown to protect a human user at temperatures in excess of 1700 degrees Fahrenheit for periods exceeding five minutes without injury to the user. Some surface color change or "charring" has been observed. By way of further advantage, and as will be described below in greater detail, the fabric material protected in accordance with the present invention maintains a substantial degree of flexibility.

It has also been determined that the present invention flame and fire retardant material functions exceedingly well with virtually all materials tested in various compositions set forth below. Similarly, it has been determined that the present invention flame and fire retardant material may be used to protectively cover virtually any fabric type or character.

More specifically, FIG. 1 sets forth a flow diagram of the creation of a flame and fire retardant material composition utilizing the present invention formula. At an initial mixing step 10, the basic ingredients of the present invention formula comprising brazing flux, baking soda, lime and redwood bark are combined in a dry mix process. Thereafter, at step 11 and additional selective additive and/or binder material is selected and further mixed into the basic ingredients. At a step 12, the resulting composition is formed or shaped as desired. At a cure step 13, the formed composition provided at step 12 is air cured at room temperature for a suitable period (typically twenty four to forty eight hours). Thereafter at step 14, a completed and cured fire and flame retardant composition resulting from the above process is obtained.

It will be apparent to those skilled in the art from the descriptions and examples set forth below in greater detail that the process set forth in FIG. 1 is readily and easily carried forward using a variety of additives and/or binder materials at step 11 for combination with the basic materials mixed at step 10. Accordingly, a substantial variety of flame and fire retardant materials having various and physical and structural characteristics are readily provided.

Figure 2:
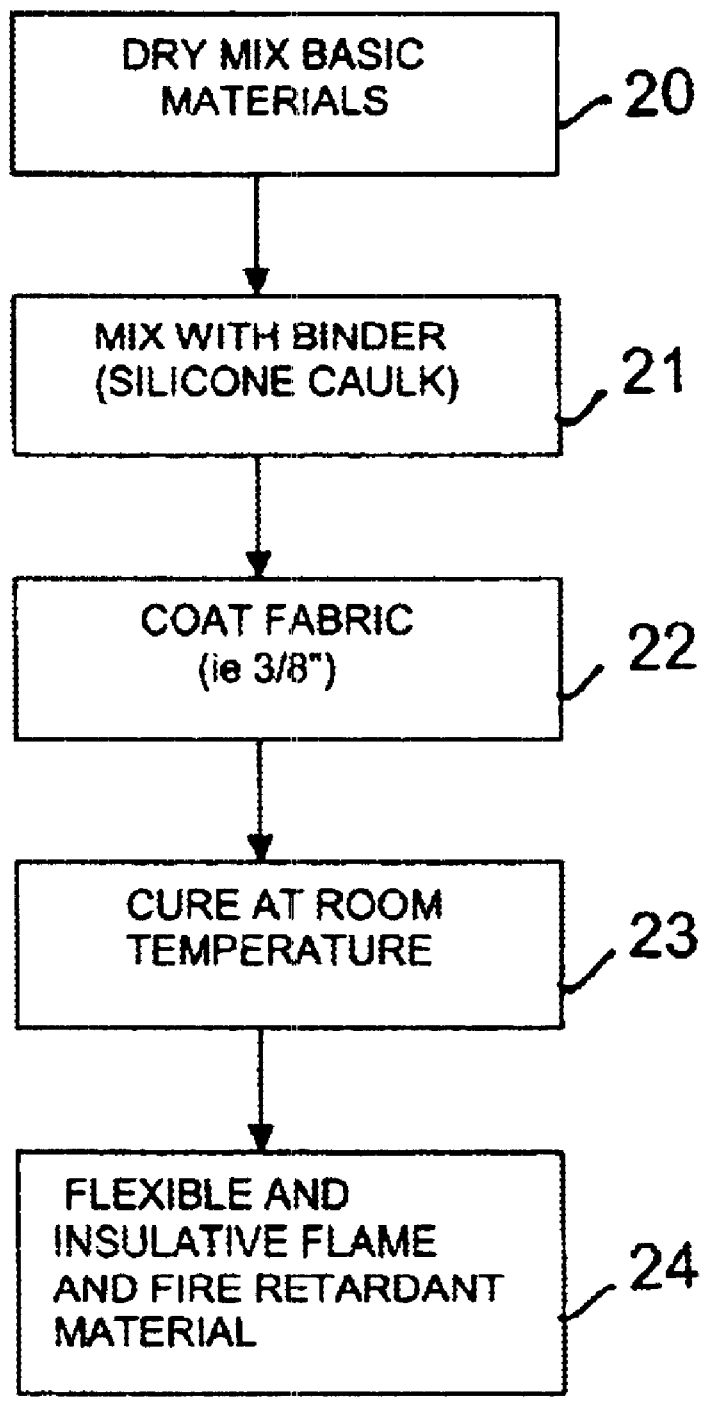
FIG. 2 sets forth a flow diagram depicting the production of the present invention fire and flame retardant material utilized in providing a protective coating composition for use upon otherwise flammable materials.

FIG. 2 sets forth a flow diagram of a process for producing the present invention material for use in providing a flame and fire retardant insulative fabric suitable for fire protective and heat protective clothing and garments. It will be apparent to those skilled in the art that the process set forth in FIG. 2 is substantially similar to the process set forth in FIG. 1 for providing a flame and fire retardant composition.

Thus at step 20, the basic ingredients of the present invention flame and fire retardant material comprising approximately equal parts of brazing flux, baking soda, lime and redwood bark are combined in a dry mix process. Thereafter at step 21, the dry mixture is combined with a suitable binder such as silicone caulk to provide a composition having appropriate adhesive and viscosity characteristic for use upon cloth fabric. Thereafter at step 22, the to-be-protected fabric such as a garment or the like is coated with the mixture and binder combination formed at step 21. While the thickness of coating is determined in large part by the degree of protection desired and other important characteristics, it has been found that substantial protection is provided by a coating of approximately $3/8$ of an inch in average thickness. Following the fabric coating process in step 22, a cure step 23 is implemented in which the coated fabric is cured at room temperature for approximately for forty-eight hours. The cure period required is determined to a substantial extent by the characteristic of the binder material used at step 21. Once the coated fabric has cured, a flame and fire retardant insulated fabric is provided at step 24.

It will be apparent to those skilled in the art that a substantial variety of fabrics may be provided with a corresponding variety of material thickness, material compositions, and coating flexibility by utilizing different binder materials within the present invention process and by applying different thickness of flame and fire retardant insulative coatings.

In order to determine and verify the flame and fire retardant and insulative properties of the present invention compositions, a number of material samples were prepared which are set forth in examples described and enumerated below. The verification of effectiveness of the material compositions provided in the examples below was confirmed utilizing a basic test and measurement apparatus having a test oven constructed from a three inch galvanized pipe nipple supported in a vertical orientation. The pipe nipple bottom end utilized a twenty-two gage galvanized sheet metal material. A loose top portion also made from twenty-two gage galvanized sheet metal provided suitable closure of the test oven. A $3/8$ inch hole formed in the side of the nipple allows the insertion of a temperature probe to measure the interior temperature of the oven cavity supporting the material under test. Typically the temperature probe end is positioned immediately adjacent to the side portion of the test sample.

In operation, the test samples are formed to a disk-like shape having a diameter somewhat less than the interior diameter of the bottom portion of the oven cavity. The test samples are placed upon the bottom surface of the oven cavity and the upper lid is placed upon the sample in direct contact. The temperature probe is introduced from the side of the oven through the $3/8$ inch hole. Finally, a torch burning either propane or mapp gas directs a flame against the lid of the oven. The interior temperature is allowed to rise under the influence of the torch flame until it reaches a steady temperature. Typically propane gas fueled torches provided approximately 1000 degree Fahrenheit. As expected, mapp gas torches provided substantially greater temperatures. The following material sets forth various examples of the present invention composition and test results.

EXAMPLE 1

A composition was prepared containing the following ingredients in which percentage are based upon material volumes.

| | |
|---|---|
| Brazing Flux | 12.5% |
| Baking Soda | 12.5% |
| Lime | 12.5% |
| Redwood Bark | 12.5% |
| Styrofoam | 16.6% |
| Cement Bonding | 16.6% |
| Cement | 16.6% |

The mixture was mixed and formed using the process set forth in FIG. 1 to form a disk-shaped sample. The sample was placed in the test oven in the manner described above. The mixture was then heated to 500 degrees Fahrenheit for five minutes, then to 750 degrees for an additional five minutes, then to 850 degrees for five minutes and finally heated to 1250 degrees for five minutes. The sample was then cooled to room temperature and inspected. The inspection revealed some discoloration with some surface charring but no burning of the sample.

EXAMPLE 2

A composition was prepared containing the following ingredients in which percentage are based upon material volumes.

| | |
|---|---|
| Brazing Flux | 12.5% |
| Baking Soda | 12.5% |
| Lime | 12.5% |
| Redwood Bark | 12.5% |
| Cement Bonding | 25% |
| Cement | 25% |

The mixture was mixed and formed using the process set forth in FIG. 2 to form a disk-shaped sample. The sample was placed in the test oven in the manner described above. The mixture was then heated to 500 degrees Fahrenheit for five minutes, then to 650 degrees for an additional five minutes, then to 850 degrees for five minutes and finally heated to 1250 degrees for five minutes. The sample was then cooled to room temperature and inspected. The inspection revealed some discoloration some surface charring but no burning of the sample.

EXAMPLE 3

Test samples were prepared utilizing silicone caulking material as a binder. For purposes of investigation, test samples were prepared of silicone caulking material alone together with test samples comprising a combination of silicone caulking material and the basic fire retardant material comprised of brazing flux, baking soda, lime and redwood bark. The test samples were formed in small galvanized molds to provide uniform shapes and allowed to cure overnight. The cured samples of silicone caulking material and silicone caulking material in combination with the above fire retardant composition were then successively placed within the test oven and subjected to elevated temperatures. Following each elevated temperature test, the samples were allowed to cool and were then removed from the test oven and examined. The samples prepared from silicone caulking material without the present invention flame and fire retardant composition additive were completely destroyed by the test. At approximately 550 degrees Fahrenheit the silicone caulking sample began to smoke and flame. Thereafter, the sample became completely vaporized by the continued test heat leaving only a small sample of material in the mold corners.

The sample prepared with the present invention flame and fire retardant composition additive showed no apparent damage or observable change in either color or elasticity. The sample using the flame and fire retardant composition additive was formed using approximately equal percentages by volume of brazing flux, baking soda, lime and redwood bark to form one half of the composition together with a quantity of silicone caulk forming the remaining half of the sample.

EXAMPLE 4

A tube-like sock of soft cotton material obtained from a T-shirt was sewn to form a closed tube of approximately fifteen inches in length and six inches in diameter. The cotton cloth material was then coated with a ⅜ inch covering of silicone caulking material in combination with the above described flame and fire retardant composition of brazing flux, baking soda, lime and redwood bark in approximately equal portions by volume. The coated cloth tube was then allowed to cure for forty-eight hours.

Following the curing of the flame and fire retardant coated cloth tube, a quantity of red shank wood was placed within a conventional BBQ pit and ignited. Based upon information provided by a local forest fire official, red shank wood burns in open air at approximately 1700 degrees Fahrenheit.

When the burning red shank wood had reached its maximum flame, the flame and fire retardant protected cloth tube was placed directly on the fire for five minutes. The interior temperature of the cloth tube was measured by placing a Pyrex brand oven thermometer inside the cloth tube. The thermometer utilized had a temperature range of one hundred to six hundred degrees Fahrenheit. A wire attached to the thermometer facilitated the removal and reading of the thermometer in a rapid process to avoid loss or change of temperature read.

During the period of time during which the sample was subjected to red shank wood flame, the thermometer was retrieved from the cloth tube and immediately read. The thermometer indicated the internal temperature of the cloth tube has slightly exceeded 150 degrees Fahrenheit. Following retrieval of the sample from the test fire and suitable cooling, inspection of the cloth tube revealed that the surface which has been placed directly upon the burning red shank wood was slightly burned to a depth of approximately one millimeter. The sample material retained its flexibility and was slightly discolored. The test results in example 4 confirmed the substantial insulating properties of the present invention fire and flame retardant material.

EXAMPLE 5

Test samples of common epoxy glue were prepared both with and without the present invention fire and flame retardant composition additive. The four ingredients of the fire and flame retardant mixture (brazing flux, baking soda, lime and redwood bark) were mixed in approximately equal quantities by percentage volumes. The resulting fire and flame retardant mixture was then combined with approximately equal quantity of the epoxy glue. The samples of pure epoxy glue and samples of epoxy glue and fire and flame retardant combination additive mixture were then allowed to dry for forty eight hours.

Following overnight drying, both samples were exposed to direct flame from a propane torch having a measured temperature of approximately 950 degrees for five minute intervals. The test sample of epoxy glue without the fire and flame retardant additive was completely vaporized and destroyed. The sample comprised of a mixture of flame and fire retardant material and epoxy glue suffered no apparent damage. The physical strength and rigidity as well as hardness of the sample appeared to be unchanged by exposure to the flame. A slight darkening of the sample surface which proved to be less than one millimeter deep did occur. The interior of the sample retained its original color.

Variation of Composition

While the basic fire and flame retardant composition comprised of brazing flux, baking soda, lime and redwood bark is often combined in the above examples in equal parts by volume, variation of proportions may be utilized without departing from the spirit and scope of the present invention. Variation ranges of volume percentages may include:

| | |
|---|---|
| Brazing flux | 10% to 40% |
| Baking soda | 10% to 40% |
| Lime | 10% to 40% |
| Redwood bark | 10% to 40% |
| Composition Total | 100% |

Additional variations of the present invention fire and flame retardant material were also tried and the resulting materials tested for their ability to withstand elevated temperatures. Thus, a further material composition was formed using the above described combination of the basic materials (brazing flux, baking soda, lime and redwood bark) together with silicone II and five parts crushed fire brick material. The resulting composition was subjected to an elevated temperature of 1250 degrees Fahrenheit for five minutes. Examination of the sample following heat testing indicated some surface charring but no material damage and no burning had occurred.

A further variation of material composition was formed using the above described basic composition of brazing flux flux, baking soda, lime and redwood bark which had been altered by the addition of two extra portions of the baking soda. The composition further included silicone together with ten parts of crushed fire brick. The resulting composition withstood a temperature of 1250 degrees Fahrenheit for five minutes with some visible charring but no material damage.

A further composition formed of the above described basic materials of brazing flux, baking soda, lime and redwood bark together with silicone was combined with five parts of volcanic rock aggregate. The resulting composition withstood elevated temperature of 1250 degrees for six minutes without visible charring, burning or other damage.

A further variation of the present invention composition having the basic materials of brazing flux, baking soda, lime and redwood bark together with two additional portions of baking soda was combined with silicone and ten parts of volcanic rock. The resulting combination withstood elevated temperatures of 1250 degrees for five minutes with some visible charring, but no burning or damage.

A still further variation of the present invention material was formed using the above described combination of basic materials (brazing flux, baking soda, lime and redwood bark) to which two additional parts of soda were added. The resulting material was combined with silicone II and ten parts of volcanic rock. The resulting material withstood elevated temperatures of 1250 degrees Fahrenheit for five minutes without visible charring, burning or damage.

Finally, a further variation of material composition was provided by combining the basic mixture of brazing flux, baking soda, lime and redwood bark together with two additional portions of baking soda and silicone II in combination with ten parts of crushed fire brick. The resulting material withstood elevated temperatures of 1250 degrees for five minutes with some visible charring but no burning or damage.

Thus, it will be apparent that a substantial variation of the basic compound of the present invention material may be utilized without departing from spirit and scope of the present invention. It will be further recognized that a virtually endless variety of materials may be combined with the basic mixture of brazing flux, baking soda, lime and redwood bark without departing from the spirit and scope of the present invention and while still providing substantial improvement in fire and flame retardant character.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A fire and flame retardant composition comprising brazing flux, baking soda, lime and redwood bark mixed in approximately equal parts by volume.

2. The fire and flame retardant composition set forth in claim 1 further including a binder material.

3. The fire and flame retardant composition set forth in claim 2 wherein said binder material includes a silicone caulking material.

4. The fire and flame retardant composition set forth in claim 3 wherein said brazing flux, said baking soda, said lime and said redwood bark combine to form approximately one half of said composition by volume.

5. The fire and flame retardant composition set forth in claim 2 wherein said binder material includes an epoxy adhesive material.

6. The fire and flame retardant composition set forth in claim 5 wherein said brazing flux, said baking soda, said lime and said redwood bark combine to form approximately one half of said composition by volume.

7. A fire and flame retardant composition comprising by percentage volume:

| | |
|---|---|
| brazing flux | 10% to 40% |
| baking soda | 10% to 40% |
| lime | 10% to 40% |
| redwood bark | 10% to 40%. |

8. The fire and flame retardant composition set forth in claim 7 wherein said composition further includes a binder material sufficient to form a paste.

9. The fire and flame retardant composition set forth in claim 8 wherein said paste is coated upon a fabric material to provide an insulative fire and flame retardant fabric material.

10. The fire and flame retardant composition set forth in claim 9 wherein said binder material includes silicone caulking material.

11. The fire and flame retardant composition set forth in claim 7 further including cement and cement bonding material.

12. The fire and flame retardant composition set forth in claim 11 further including silicone caulking material.

* * * * *